US006538409B2

(12) United States Patent
Takemoto

(10) Patent No.: US 6,538,409 B2
(45) Date of Patent: Mar. 25, 2003

(54) PRINTER BELT DRIVE CONTROL CIRCUIT

(75) Inventor: Hitoshi Takemoto, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/757,933

(22) Filed: Jan. 10, 2001

(65) Prior Publication Data

US 2001/0007415 A1 Jul. 12, 2001

(30) Foreign Application Priority Data

Jan. 12, 2000 (JP) ....................................... 2000-003425

(51) Int. Cl.[7] ................................................ G05B 11/01

(52) U.S. Cl. ........................ 318/560; 318/567; 318/569; 318/600; 318/798; 318/3

(58) Field of Search ................................ 318/560, 567, 318/569, 600, 798, 3

(56) References Cited

U.S. PATENT DOCUMENTS 5,076,568 A * 12/1991 deJong et al. .............. 271/275
5,325,155 A 6/1994 Perry
5,737,216 A 4/1998 Hokari
5,963,706 A 10/1999 Baik
6,030,067 A * 2/2000 Kawamura ................... 347/37
6,155,680 A * 12/2000 Belon et al. ................ 347/104
6,301,862 B1 * 10/2001 Yuyama et al. ............... 53/562

* cited by examiner

*Primary Examiner*—Karen Masih
(74) *Attorney, Agent, or Firm*—Dickstein, Shapiro, Morin & Oshinsky, LLP.

(57) ABSTRACT

A printer belt drive control circuit comprises: an encoder count circuit (4) for counting output signals from a drive encoder (11) attached to a drive motor (10) and from a motor encoder attached to a belt motor (6), a servo controller which under control of a CPU (1) and outputs a rotation speed information of the belt motor (6) according to tan output signal from the encoder count circuit (4), and a motor drive signal generation circuit for converting an output information from the servo controller (2) into a form appropriate for an H-bridge driver circuit (5) which directly drives the belt motor (6)

5 Claims, 8 Drawing Sheets

PRINTER BELT DRIVE CONTROL CIRCUIT

BACKGROUND OF THE INVENTION

1. Field of the Invention

The present invention relates to a printer belt drive control circuit and in particular, to a color electro-photographic printer belt drive control circuit.

2. Description of the Related Art

Explanation will be given on a conventional printer belt drive control circuit with reference to the attached drawings.

FIG. 6 is a schematic side view of a printer belt drive control scheme as a first conventional example (as disclosed in Japanese Patent Publication 03-133670). The printer belt drive control scheme shown in FIG. 6 includes rotary drums 225*a* and 225*b*, a photosensitive belt 221 placed over the rotary drums 225*a* and 225*b*, an encoder 223 arranged on a pulley for controlling the feed speed of the photosensitive belt 221; rotary drums 226*a* and 226*b*, a paper feed belt 222 placed over the rotary drums 226*a* and 226*b*, and an encoder 224 arranged on a pulley for controlling the feed speed of the paper feed belt 222.

In such a scheme, one color printing process includes a cycle of exposure, development, and transfer repeated for the number of colors of the developer and it is very difficult to overlap the color images. Especially when an eccentricity is present in the rotary drums 225*a* and 225*b* feeding the photosensitive belt 221 or in the rotary drums 226 and 226*b* feeding the paper feed belt 222 or in the pulleys of the encoders 223 and 224, the respective color images are obtained out of the ideal image positions, disabling the correct overlap of the color images.

If it is assumed that an image data write is started by a laser beam oscillation from a laser beam oscillator (not depicted) upon reception of a detection signal of the top of a paper (not depicted) from an image top detection sensor (not depicted), and if it is assumed that the time $t_1$ , required for the paper top to travel from an image top detection position B to a transfer position A is equal to the time $t_2$ required for the write tip of the photosensitive belt 221 to travel from a write position C to the transfer position A, then an image exposed and developed is transferred to the paper, starting from the paper top.

$$t_1=x_1/v_1,\ t_2=x_2/v_2$$

therefore, $$x_1/v_1=x_2/v_2$$

wherein $v_1$ is a feed speed of the photosensitive belt 221 detected by the encoder 223; $V_2$ is a feed speed of the paper feed belt 222 detected by the encoder 224; $x_1$ is a feed distance of the photosensitive belt 221 from the write position C to the transfer position A; and $x_2$ is a feed distance of the paper feed belt 222 from the image top detection position B to the transfer position A.

If the feed speed $v_1$ of the photosensitive belt 221 is different from the feed speed $v_2$ of the paper feed belt 222, then a slip is caused between the photosensitive belt 221 and the paper at the transfer position A. Accordingly, it is assumed that $$v_1=v_2.$$

Accordingly, if the feed speed v1 of the photosensitive belt 221 and the feed speed v2 of the paper feed belt 222 are maintained at a constant value by the encoders 223 and 224 and if the feed distance x1 of the photosensitive belt 221 and the feed distance x2 of the paper feed belt 222 are maintained at a constant value, the color images at the respective cycles of exposure, development, and transfer are completely matched with one another.

However, if an eccentricity is present in one of the rotary drums 225*a*, 225*b*, 226*a*, and 226*b* (as shown by a dotted-broken line in FIG. 6), the feed distance $x_1$ of the photosensitive belt 221 and the feed distance $x_2$ of the paper feed belt 222 vary for different cycles of exposure, development, and transfer of respective color images, and the time $t_1$ does not coincide with the time $t_2$, causing mis-overlap of different color images.

The same happens if an eccentricity is present in the pulley of the encoder 223 or 224.

FIG. 7 is circuit diagram and FIG. 8 is a servo block diagram of a second conventional example.

A belt motor 6 is provided with only a motor encoder 7 and a belt is controlled by feed back of the motor speed information. There is no consideration on the allowance or rigid components of the gears in a drive transmission mechanism. To obtain a constant rotation of the belt via a drive roller, it has been difficult to constitute a stable belt control system.

SUMMARY OF THE INVENTION

It is therefore an object of the present invention to provide a belt drive control circuit enabling to rotate a belt at a stable constant speed.

The printer belt drive control circuit according to the present invention includes: an encoder attached to a drive roller for driving a belt to be controlled, and a servo circuit for controlling a rotation speed of a motor for driving the drive roller to be constant according to an output signal from the encoder.

According to another aspect of the present invention, the printer belt drive control circuit includes: a first encoder attached to a drive roller for driving a belt to be controlled, a second encoder attached to a main shaft of a motor for driving the drive roller, and a servo circuit for controlling a rotation speed of a motor driving the drive roller to be constant according to an output signal from the first encoder and an output signal from the second encoder.

According to still another aspect of the present invention, the printer belt drive control circuit includes: an encoder count circuit (4) for counting output signals from a drive encoder (11) attached to a drive motor (10) and from a motor encoder attached to a belt motor (6), a servo controller which under control of a CPU (1) and outputs a rotation speed information of the belt motor (6) according to tan output signal from the encoder count circuit (4), and a motor drive signal generation circuit for converting an output information from the servo controller (2) into a form appropriate for an H-bridge driver circuit (5) which directly drives the belt motor (6).

According to yet another aspect of the present invention, the servo controller includes: an internal ROM contains a program of a control algorithm used for driving a belt (12) and computation equations for control by a software servo method, and an internal register containing servo constants and servo parameters used for a servo computation, which are read out, when necessary, to be substituted in a computation equation.

According to still yet another aspect of the present invention, the belt drive control circuit (8) is controlled in a closed loop.

According to further another aspect if the present invention, the belt drive control circuit (8) is controlled in a closed loop using software servo control.

DESCRIPTION OF THE PREFERRED EMBODIMENTS

Description will now be directed to a preferred embodiment of the present invention with reference to the attached drawings.

Figure 1:
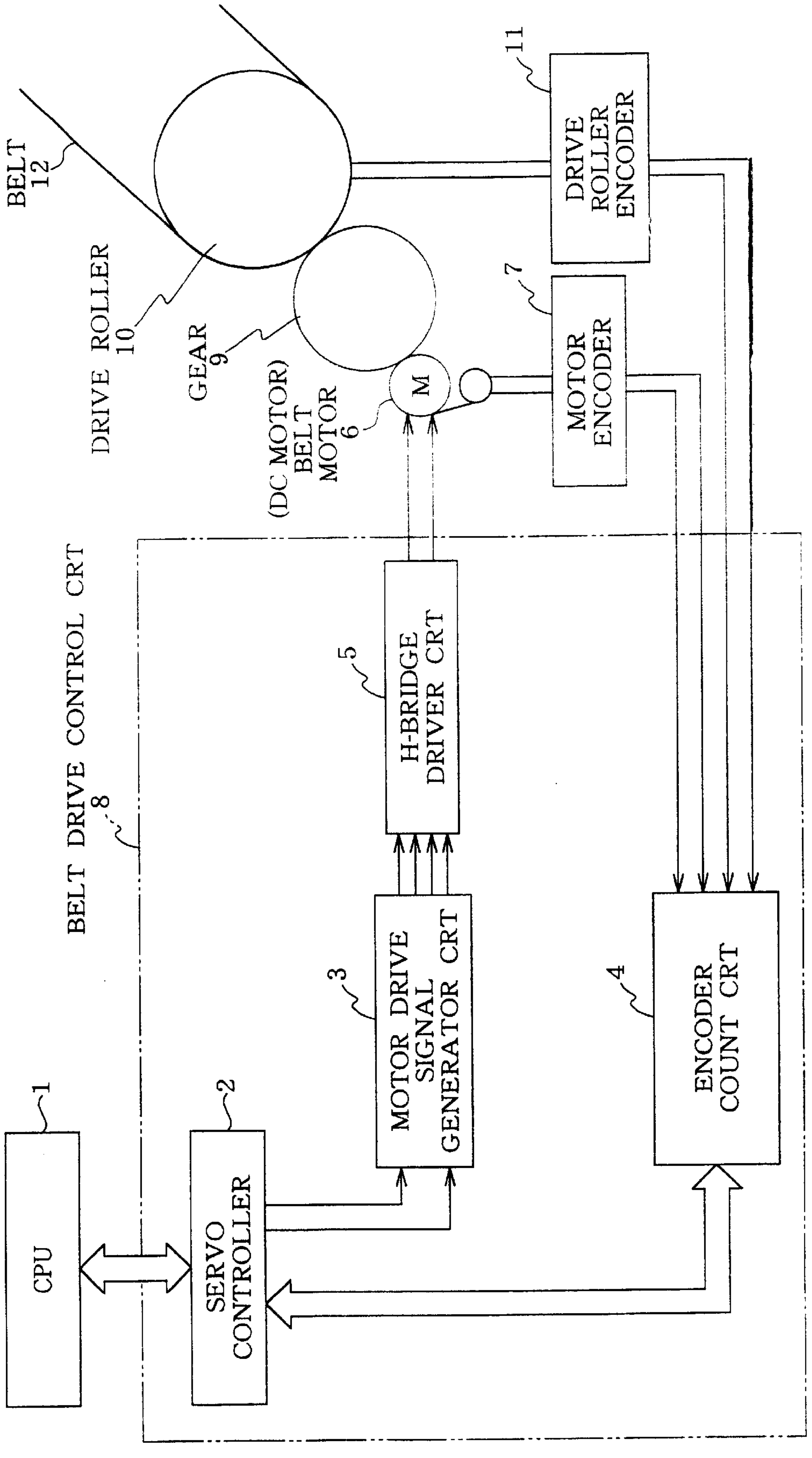
FIG. 1 is a block diagram showing a first embodiment of the present invention.

FIG. 1 is a block diagram of the embodiment of the present invention. A belt drive control circuit 8 includes a servo controller 2, a motor drive signal generation circuit 3, an H-bridge driver circuit 5, and an encoder count circuit 4. Moreover, a color electro-photographic printer belt drive unit includes a belt motor 6, a gear 9 for transmitting a belt motor drive force, a drive roller 10 to which the drive force is transmitted via the gear 9, and a belt 12 rotated by rotation of the drive roller 10. The belt motor is provided with a motor encoder 7 and the drive roller 10 is provided with a drive roller encoder for feed back of a speed information of the belts to be controlled.

The servo controller 2 controls the belt drive control circuit 8 according to the present invention and includes an internal ROM containing a program of the algorithm for controlling to drive the belt. The ROM contains computation equations and the like used for controlling by a so-called software servo method. Moreover, the servo controller 2 includes an internal register (not depicted) containing a servo constant and servo parameters used in servo computation performed by the servo controller 2. They are read out from the servo controller 2 when required and substituted into computation equations. The motor drive signal generation circuit 3 converts a computation result output from the servo controller 3, into a drive signal to the belt drive motor. The H-bridge driver circuit 5 is composed of a driver IC and the like for converting the motor drive signal output from the motor drive signal generation circuit 4, into a motor drive voltage. The encoder count circuit 4 computes a speed information of the motor encoder 7 fed back from the belt motor 6 and a speed information of the drive roller encoder 11 fed back from the drive motor 10, and outputs computation results to the servo controller 2.

As has been described above, the belt drive control circuit 8 constitutes a belt motor control system as a closed loop and controls the belt motor to rotate at a constant speed.

Next, explanation will be given on the operation.

Figure 2:
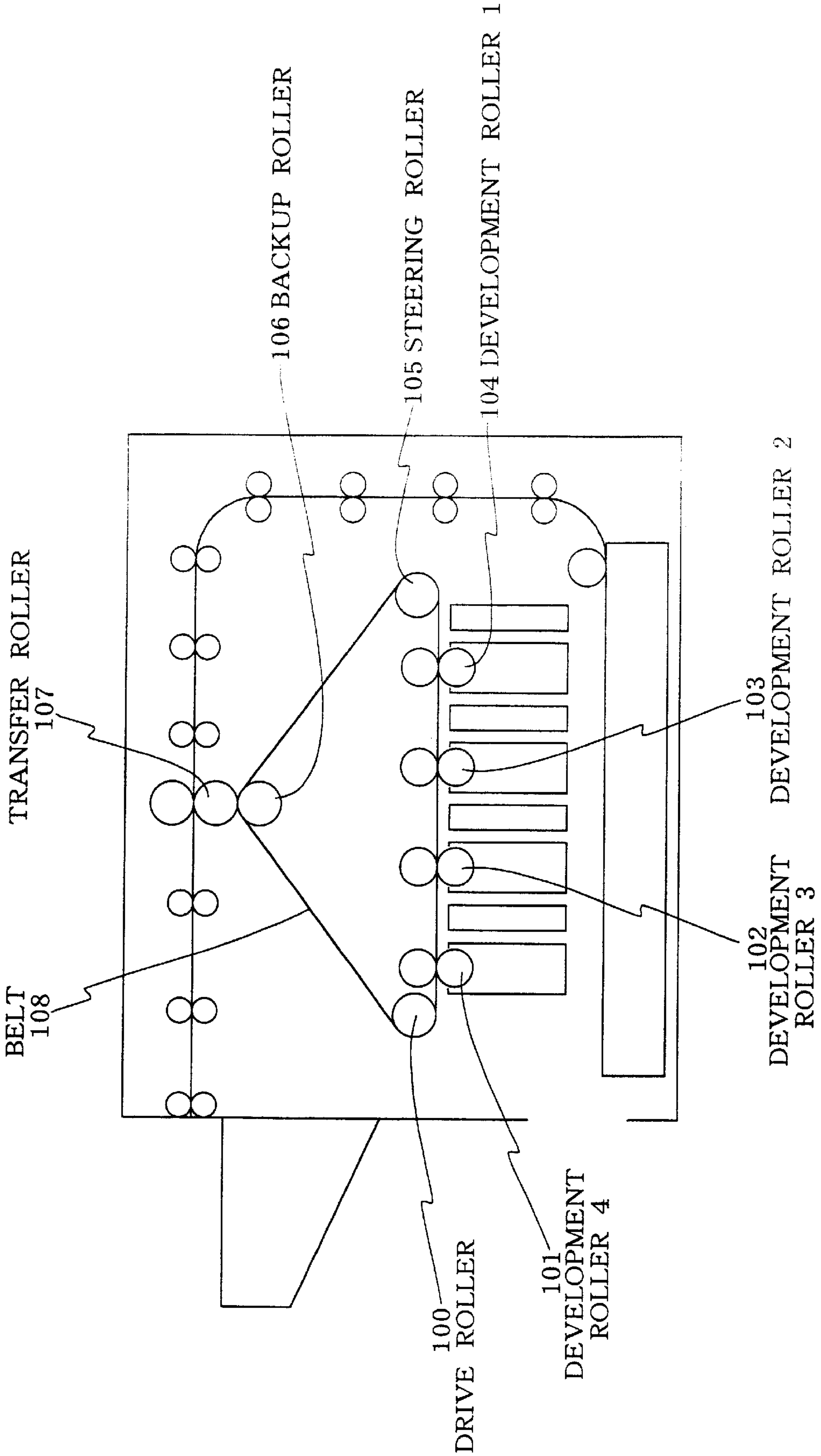
FIG. 2 shows an external load configuration around a belt drive block.

FIG. 2 shows an external load configuration around a belt drive block in the electro-photographic printer. The belt drive block to be controlled according to the present invention has such a configuration that when a print sequence is performed, an external load such as developing rollers 1 to 4 and a transfer roller 107 is brought into a pressed contact with a belt 108. the belt 108 is rotated by a drive force for a belt motor (not depicted)d which is transmitted via a gear to a drive roller 100. The belt 108 is held by a steering roller for collecting a meander of the belt, a backup roller 106 arranged against the transfer roller via the belt 108, and the like, so that the belt 108 is rotated at a constant speed. Even when the external load round the belt drive block is applied, it is possible to rotate the belt at a constant stable speed by using the color electro-photographic printer belt drive control circuit according to the present invention, whose function will now be explained with reference to FIG. 1.

A CPU 1 at an upper node to the belt drive control circuit controls the entire print sequence of the electro-photographic printer. The CPU 1, upon reception of a print request made by an operator through an operation panel, transmits control instructions to respective units constituting the electro-photographic printer. A servo controller 2 receives a motor rotation instruction from the CPU 1.

The servo controller 2, upon reception of the belt rotation instruction, executes a servo computation equation programmed in advance and outputs a belt rotation speed information to a motor drive signal generation circuit 3. The servo controller 2 reads out an optimal servo constant and a servo parameter from an internal register and substitute them in the aforementioned servo computation equation to execute the servo computation equation.

Next, the motor drive signal generation circuit 3 converts the rotation speed information received from the servo controller 2, into a signal for driving a driver circuit 5 composed of an H-bridge, and outputs the signal.

The H-bridge driver circuit 5 converts the drive signal into a motor drive voltage and outputs it to a belt motor 6, so that the belt motor 6 starts rotation.

The drive force of the rotation of the belt motor 6 is transmitted via a gear 9 to a drive roller 10, and the drive roller 10 starts rotation.

The rotation speed of the drive roller 10 is detected as a speed information by a drive roller encoder 11 and converted into a digital information by an encoder count circuit 4, which is fed back to the servo controller 2.

The servo controller 2 compares the actual rotation speed information of the drive roller 10 fed back, to a target speed, after which the servo controller 2 again executes the servo computation equation and outputs a rotation speed information to the motor drive signal generation circuit 3.

The aforementioned control is repeated so that the drive roller 10 is rotated at a constant speed by the belt motor 6, thereby controlling the belt 12 to rotate at a constant speed.

Figure 3:
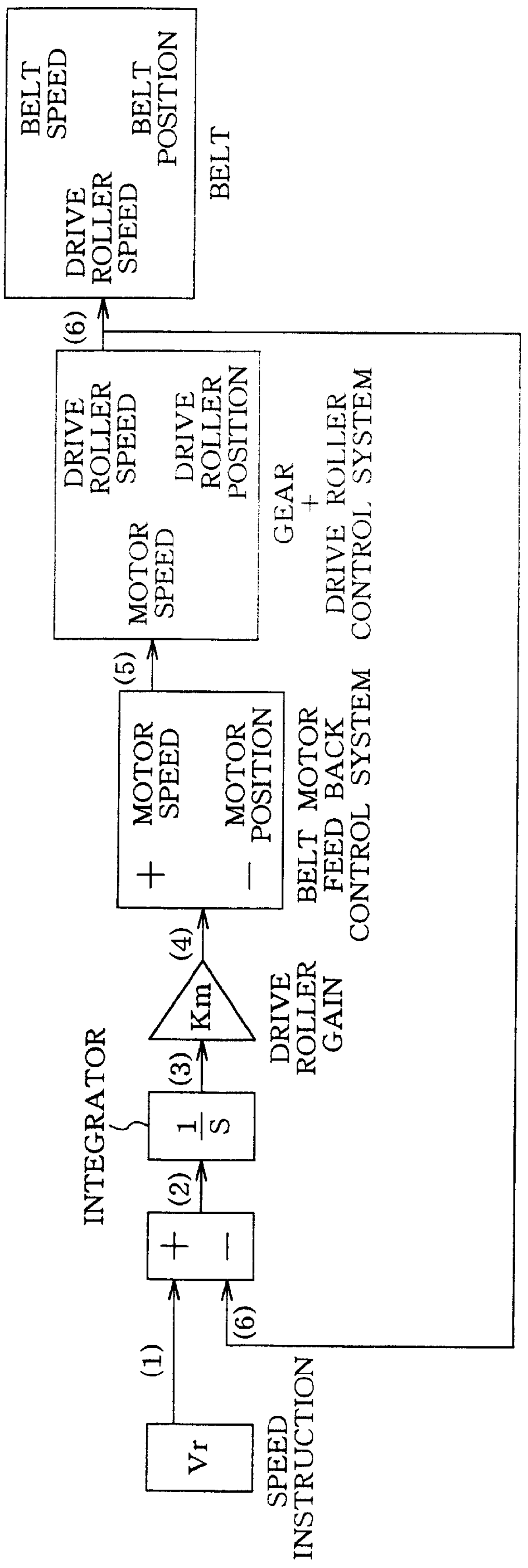
FIG. 3 is a servo block diagram explaining details of the present invention.

FIG. 3 is a servo block diagram explaining details of the present invention. This servo block diagram explains the servo control computed by the servo controller shown in FIG. 1.

Figure 4:
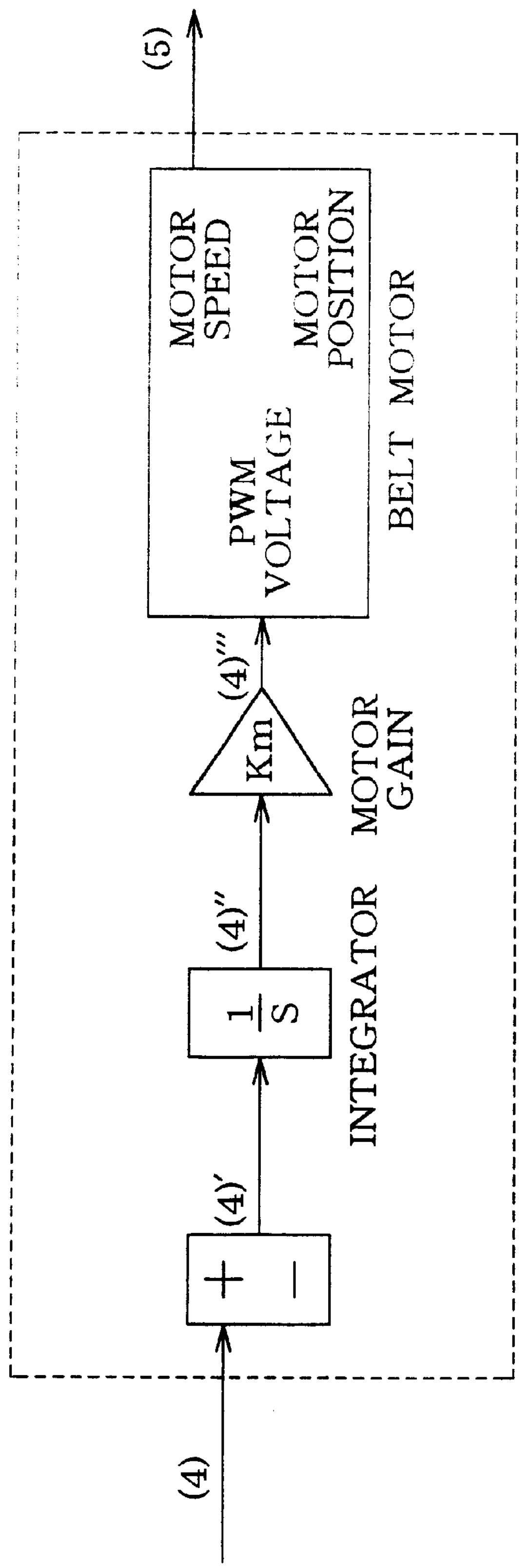
FIG. 4 is a servo block diagram explaining details of the present invention.

Firstly, a speed instruction (1) for rotating the drive roller at a constant speed and a current speed (6) of the drive roller fed back are supplied to an adder. A difference (2) between (1) and (6) is supplied to an integrator. An integration result (3) is obtained in the integrator. A feed back gain (4) of a drive roller control system is given to the integration result and supplied to a motor feed back control system including the belt motor. Here, the belt motor feed back control system has a configuration as shown in FIG. 4. After the feed back gain (4) of the drive roller is given to the feed back control system, it is supplied to the adder (here, the motor speed feed back is not input and accordingly, not input to a minus side adder) and the output result (4)' is integrated in the integrator to obtain (4)", which is then converted into a PWM voltage (4)''' by giving the motor feed back gain. The (4)''' is supplied to the belt motor. The belt motor, with the PWM voltage, rotates, generating a motor speed. The rotation output (5) is transmitted to a gear+drive roller control system. The gear+drive roller shown in FIG. 3 receives the rotation output (5) and the gear rotates. Its drive force is transmitted to the drive roller to rotate the drive roller. This rotation generates a drive roller speed (6) to rotate the belt connected to the drive roller. The drive roller speed (6) is fed back to the drive roller control system and added to the speed instruction (1). The aforementioned control is repeated for computation so as to rotate the drive roller at a constant speed.

Figure 5:
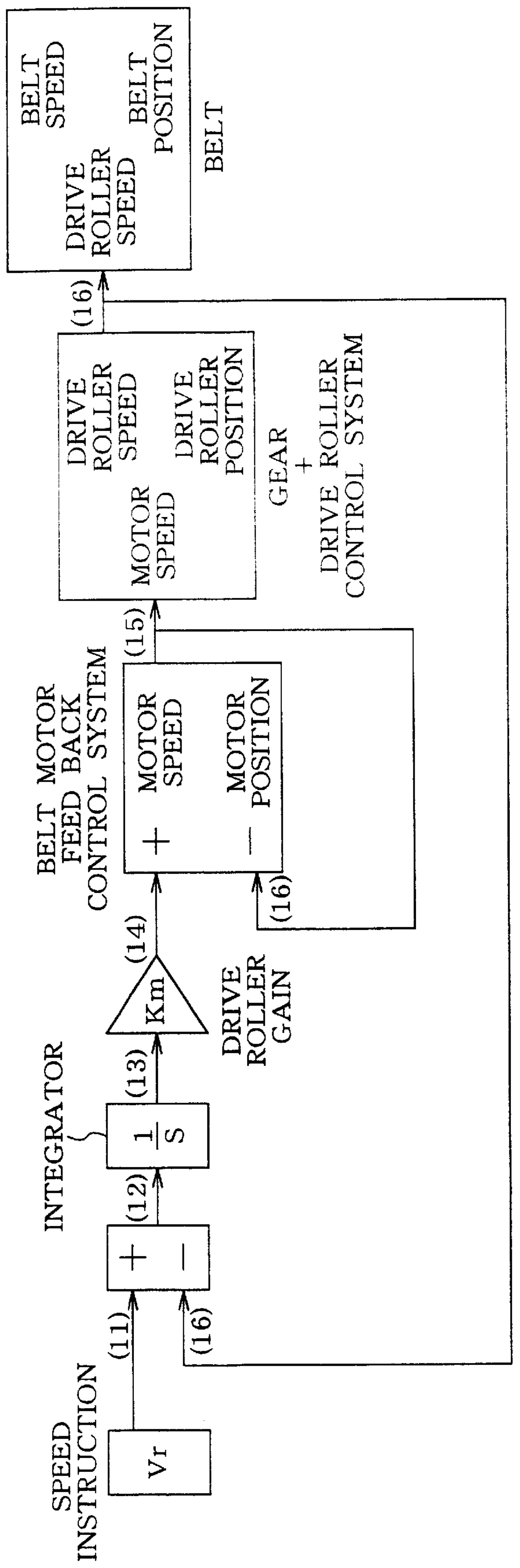
FIG. 5 is a servo block diagram explaining details of the present invention.
Figure 6:
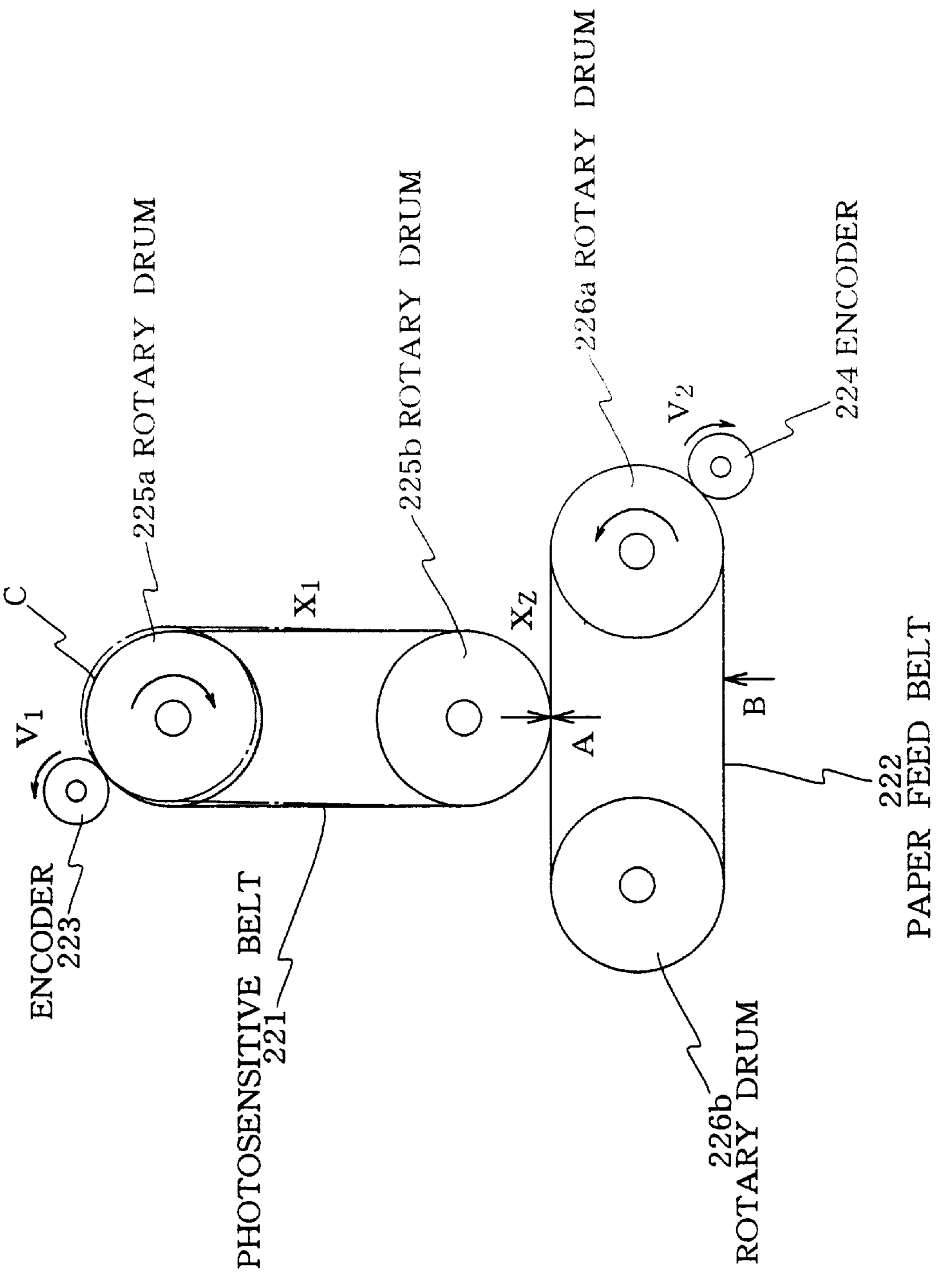
FIG. 6 is a schematic side view of a first conventional example.
Figure 7:
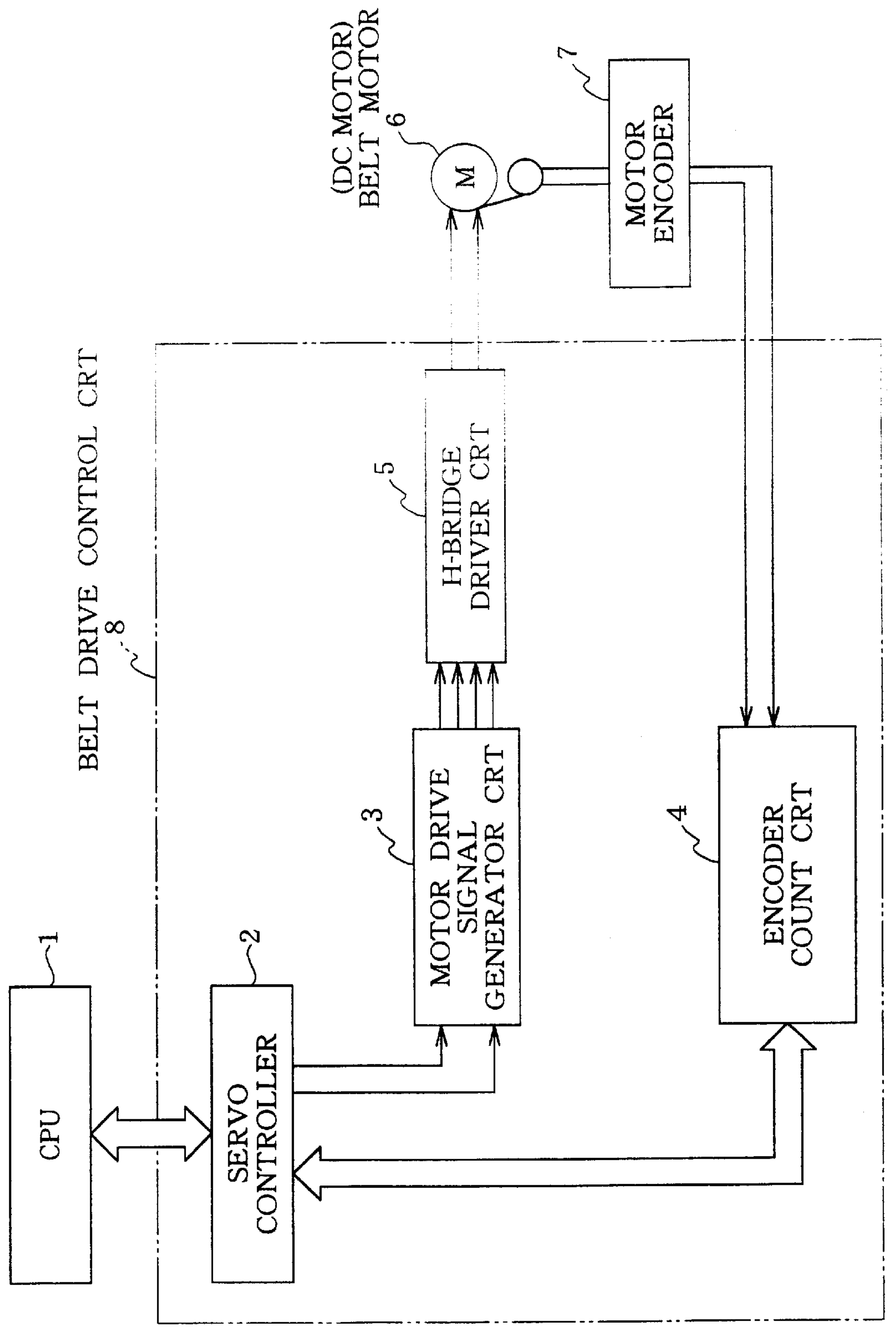
FIG. 7 is a circuit diagram of a second conventional example.
Figure 8:
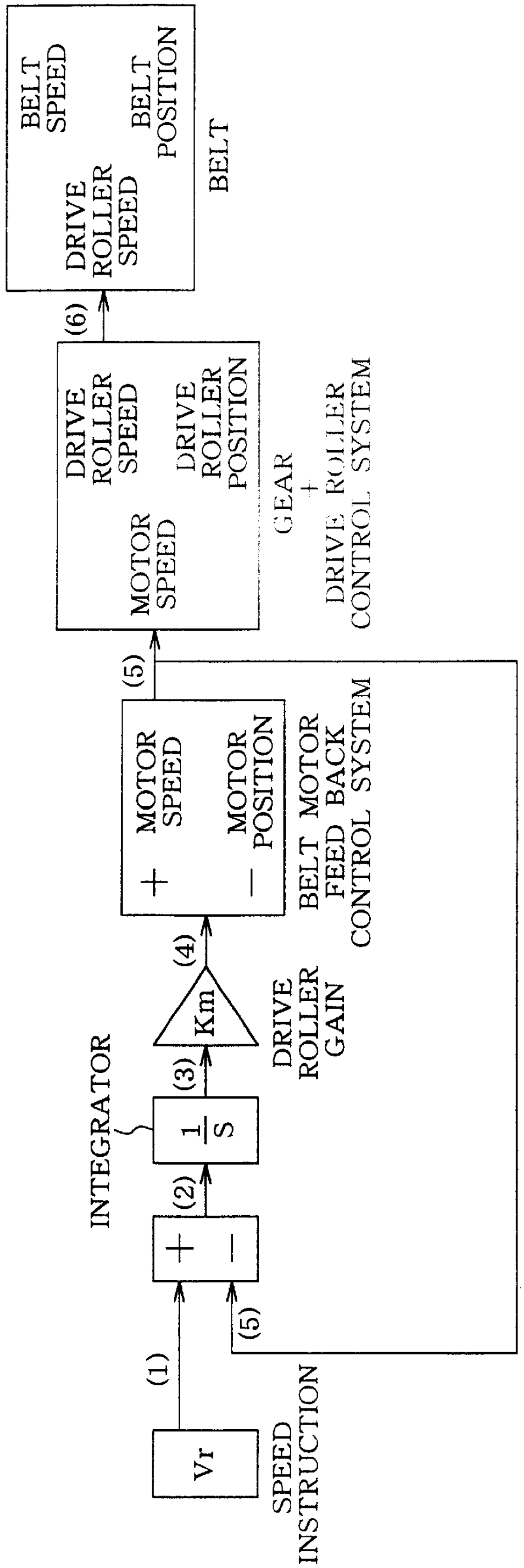
FIG. 8 is a servo block diagram of a second conventional example.

It should be noted that in the aforementioned configuration, control is performed according to a speed information of the encoder attached to the drive roller. However, as shown in the servo block diagram of FIG. 5, it is also possible to feed back the motor speed to constitute a motor speed control loop to be involved in the drive roller speed control loop, so as to perform a dual closed loop control.

The printer belt drive control circuit according to the present invention additionally includes a drive roller encoder so as to constitute a stable belt control system considering the gear allowance and rigidity component present in the drive transmission means from a motor to a gear, thereby enabling to rotate a belt at a constant speed.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-003425 (Filed on Jan. $12^{th}$, 2000) including specification, claims, drawings and summary are incorporated herein by reference in its entirety.

What is claimed is:

1. A printer belt drive control circuit comprising:

a first encoder attached to a drive roller for driving a belt to be controlled, a second encoder attached to a main shaft of a motor for driving the drive roller, and a servo circuit for controlling a rotation speed of a motor driving the drive roller to be constant according to an output signal from the first encoder and an output signal from the second encoder.

2. A printer belt drive control circuit comprising:

an encoder count circuit for counting output signals from a drive encoder attached to a drive roller and from a motor encoder attached to a belt motor, a servo controller which under control of a CPU and outputs a rotation speed information of the belt motor according to an output signal from the encoder count circuit, and a motor drive signal generation circuit for converting an output information from the servo controller into a signal that is able to drive an H-bridge driver circuit which directly drives the belt motor.

3. A printer belt drive control circuit as claimed in claim 2, wherein the servo controller includes:

an internal ROM contains a program of a control algorithm used for driving a belt and computation equations for control by a software servo method, and an internal register containing servo constants and servo parameters used for a servo computation, which are read out, when necessary, to be substituted in a computation equation.

4. A printer belt drive control circuit as claimed in claim 2, characterized in that the belt drive control circuit is controlled in a closed loop.

5. A printer belt drive control circuit as claimed in claim 2, characterized in that the belt drive control circuit is controlled in a closed loop using software servo control.

* * * * *